V. P. McVOY.
HOSE COUPLING.
APPLICATION FILED FEB. 4, 1909.
939,435.
Patented Nov. 9, 1909.
2 SHEETS—SHEET 1.
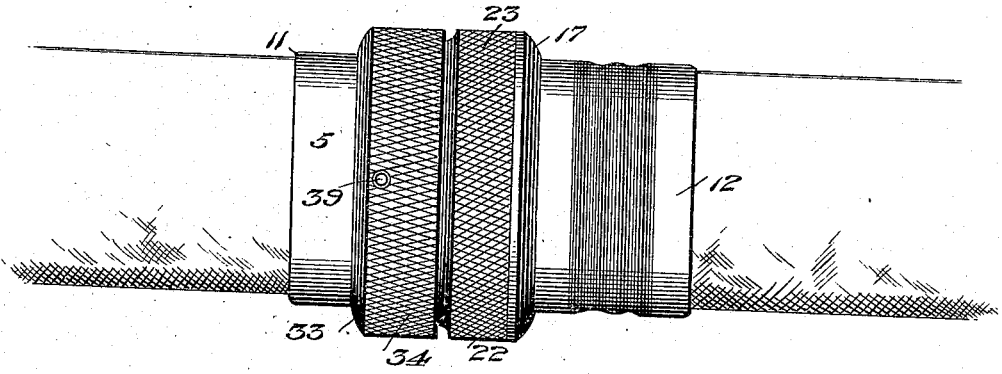
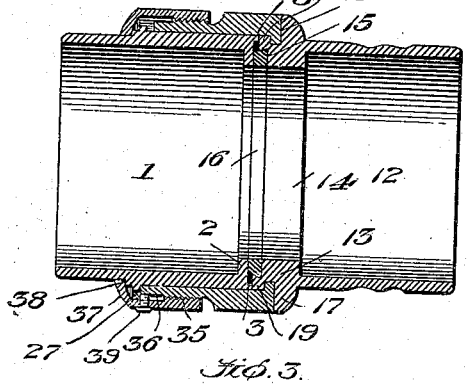
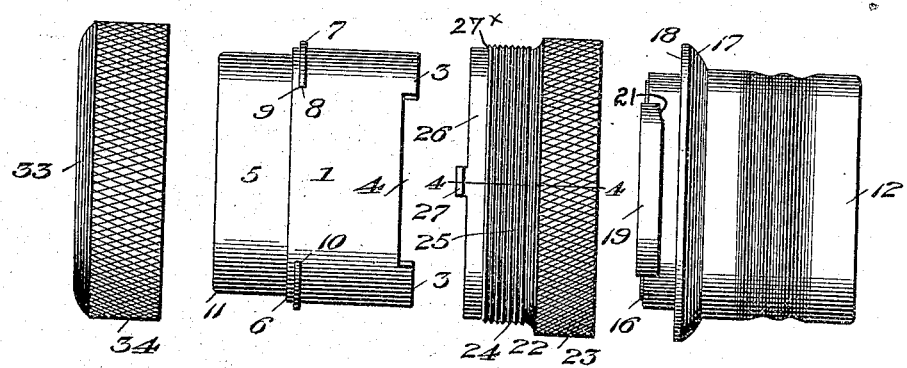
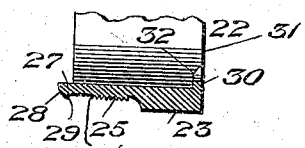
Witnesses
Inventor
Vincent P. McVoy
By E. H. Bond
Attorney

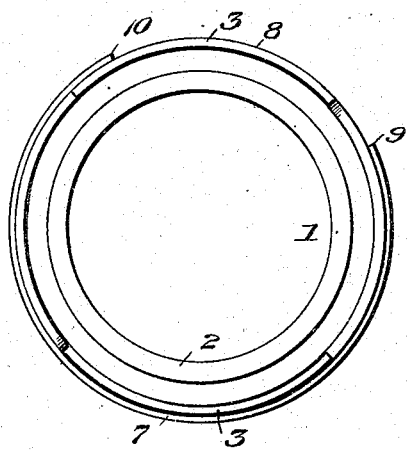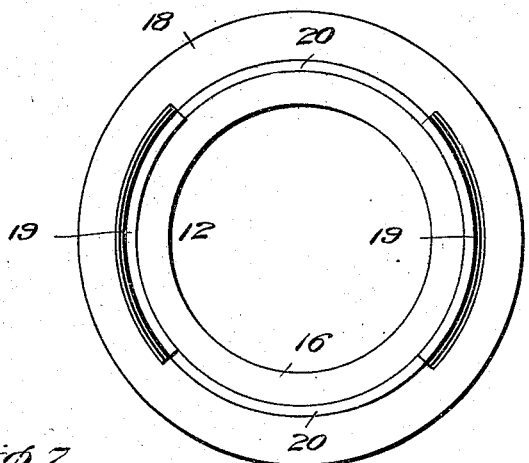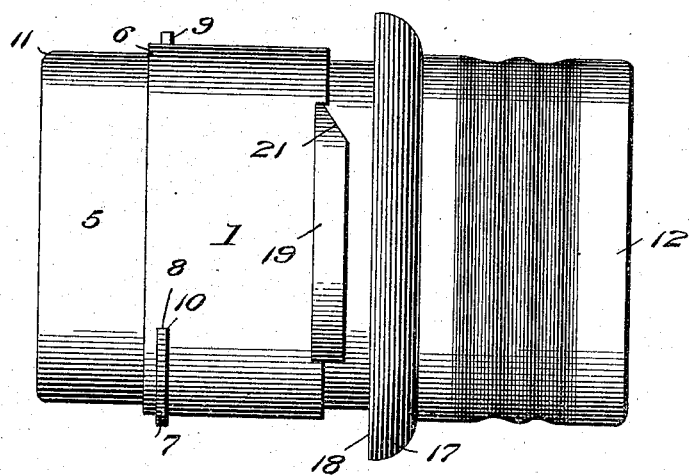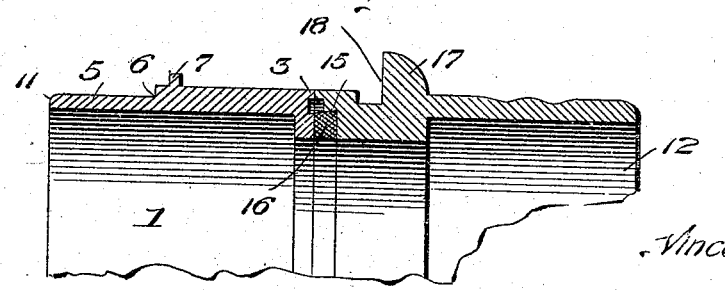

UNITED STATES PATENT OFFICE.

VINCEN P. McVOY, OF MOBILE, ALABAMA.

HOSE-COUPLING.

939,435.

Specification of Letters Patent. Patented Nov. 9, 1909.

Application filed February 4, 1909. Serial No. 475,960.

*To all whom it may concern:*

Be it known that I, VINCEN P. MCVOY, a citizen of the United States of America, and resident of Mobile, in the county of Mobile and State of Alabama, have invented certain new and useful Improvements in Hose-Couplings, of which the following is a specification.

This invention relates to certain new and useful improvements in hose couplings, and it has for its objects among others to provide an improved efficient hose coupling composed of few parts, in which the employment of screw-threaded parts is practically dispensed with, there being but one member having threaded engagement with another.

A further object is to provide a coupling in which the parts are capable of manufacture at small cost and without complicated machinery, all of the parts being capable of being turned on an ordinary lathe, these parts readily assembled or disassembled when necessary for repairs or other purposes and, when assembled and the parts coupled, endwise disengagement is prevented, yet a partial turn of the intermediate member couples or uncouples the parts. A tightening sleeve is provided for tightening the parts after they are coupled and also for locking them against accidental uncoupling. The parts are assembled by a longitudinal sliding movement one within the other and the members themselves are of novel construction and adapted for coöperation for the accomplishment of the desired end.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification, and in which—

Figure 1 is a side elevation of my improved coupling with the parts applied to sections of hose and coupled. Fig. 2 is a substantially central longitudinal section through the coupling with the parts in coupled position. Fig. 3 is an elevation of the parts constituting the coupling, said parts being shown detached but in their relative positions. Fig. 4 is a sectional detail on the line 4—4 of Fig. 3. Fig. 5 is an end view of the body portion of the coupling. Fig. 6 is an end view of the coöperating half or section of the coupling. Fig. 7 is a side elevation of the two members shown in Figs. 5 and 6 juxtaposed, the exterior members being omitted. Fig. 8 is a longitudinal section through Fig. 7. Figs. 5 to 8 are on an enlarged scale.

Like numerals of reference indicate like parts in the several views.

Referring to the drawings, 1 designates what I term the body portion or member of the coupling. It is formed at one end with an internal annular flange 2, the outer face of which forms a seat for the gasket, as seen in Fig. 2. At this end, the body portion or member 1 is formed with the flanges or projections 3 extending in the direction of the length of the member and flush with the outer periphery thereof. These flanges extend each substantially a quarter of the circumference of the member, as seen best in Fig. 5, leaving spaces 4 between the adjacent ends of each two flanges. These flanges serve to prevent turning of the members relatively to each other when coupled. Near the midheight of the member 1, the same is reduced in diameter, as at 5, forming an annular shoulder 6 and adjacent said shoulder upon the larger diameter of the member is an annular flange 7 which, however, is not continuous but is interrupted, as shown at 8, forming the shoulders or abutments 9 and 10 for a purpose soon to be described. To facilitate application or assemblage of the parts, the outer end of this reduced portion 5 may sometimes be rounded, as seen at 11, although it is evident that this feature may not always be present.

12 is the coöperating member of the coupling. It is formed interiorly with an annular shoulder or flange 13; in the face of the reduced portion 14 forming such shoulder is formed an annular groove or socket 15 having undercut wall, as seen best in Fig. 8, for the reception of the packing ring or gasket 16 which, as before stated, has a bearing against the adjacent shoulder or seat formed by the internal annular collar 2 of the member 1. This gasket may be cemented or otherwise retained within its socket or I may rely solely upon friction for retaining the said gasket against displacement.

17 is an exterior flange on the member 12, the outer face of which is rounded, as seen clearly in the different views, so as to avoid sharp corners, which latter have been found objectionable in that they interfere with the drawing of the hose through doors and over obstructions. It will be observed, particularly upon reference to Fig. 1, that in my coupling I dispense with all projecting parts, such as lugs for the reception of a spanner or other purposes and that I also avoid square or sharp corners, thus greatly facilitating handling of the hose, permitting the same to be run out of the wagons freely or carried through a house, over a roof, etc. The front face of this annular flange 17 forms a square shoulder, as seen at 18, against which the end of the sleeve member abuts, as shown clearly in Fig. 2, so as to form a tight joint and prevent ingress of dust or dirt, the diameter of the said flange 17 and of the sleeve being the same or substantially so, as seen in Fig. 2.

The member 12 is formed at its end adjacent the gasket-socket portion with the ribs 19, each of which extends substantially a quarter of the circumference, as seen best in Fig. 6, leaving the spaces 20 between adjacent ends of the ribs. The ribs 19 each have one end tapered, as seen at 21, to facilitate engagement of the parts.

22 is a coupling sleeve. It has a milled periphery, as seen at 23, for an obvious purpose, and is provided with a reduced portion 24 provided with external right-handed threads 25 and beyond the threaded portion it is formed with a reduced annular unthreaded portion 26 forming a shoulder 27× at its junction with the threaded portion, and extending in the direction of the length of the sleeve at the outer end of the portion 26 is a lug 27 which has a rounded end, as seen at 28, and a shoulder 29 at the rear, as seen best in Fig. 4. At the opposite end this sleeve member is formed with ribs 30 which are oppositely disposed, as seen in Fig. 2. These ribs extend each substantially a quarter of the circumference of the member 22, leaving spaces 31 therebetween corresponding to the lugs 19 on the member 12. The ribs 30 each have one end rounded, as shown at 32, in Fig. 4, for the purpose of facilitating interengagement of the parts.

33 is a tightening and locking ring. It is roughened or milled peripherally, as shown at 34, and interiorly is threaded, as shown at 35, to engage the threads 25 of the coupling sleeve 22. The threads of this tightening and locking ring do not extend for the entire depth of the ring, but terminate at a distance from the outer end so as to leave the annular flat unthreaded portion 36, for a purpose which will hereinafter appear. The outer end of the ring is rounded, as shown at 37, and provided with an internal annular shoulder 38, as seen clearly in Fig. 2.

The parts are assembled as follows. The body portion 1 is inserted within the sleeve 22, the member 27 of the sleeve engaged within the space 8 between the ends 9 and 10 of the interrupted flange 7 of the member 1, the said flange then having a bearing against the adjacent end of the sleeve upon which it may rotate within limits prescribed by the ends of the flange. The tightening and locking ring 33 is then applied over the outer end of the body portion 1, its inwardly turned end engaging with its shoulder 28 against the shoulder 6 of the member 1, as will be understood clearly upon reference to Fig. 2, and serving to exclude dust, dirt and all extraneous matter. A screw or the like 39 is then engaged in a threaded opening in the annular portion of the tightening and locking ring, the inner end of said screw being received in the unthreaded annular space 26 and in the unthreaded space 36 of the ring. This, however, is but one form of stop and it is to be understood that any other form of inward projection may be provided in lieu of the screw threaded into the ring. The body portion 1 with the sleeve and ring thus assembled is attached to the end of one member of the hose and the member 12 is attached to the end of the other hose section.

To couple the hose, the member 12 is brought with its lugs opposite the spaces between the lugs of the member 1 and then by giving either member a partial revolution so that the lugs of the two members are interengaged or interlocked and then by tightening up the ring 33, the parts are securely tightened in such interlocked position. In screwing up the tightening and locking ring, the stop pin 39 by reason of the circumferential freedom of motion which it has along the unthreaded space 26 permits slight endwise movement of the sleeve 22 before the lugs 30 tightly bind against the lugs 19 so as to compress the gasket and form a perfectly water-tight joint before the inner end of the portion 26 of the sleeve 22 binds against the annular flange 7 of the member 1, thus compensating for wear in the gasket so as to always insure that the joint shall be tight. The shoulder 6 and the flange 7 serve to limit the movements of the ring 33 and the sleeve 22 toward each other beyond prescribed limits.

In actual use, the forward movement of the ring 33 is arrested by the growing tightening caused by the interengagement of the locking parts.

In disconnecting the coupling, the ring 33 is revolved toward the left. The first effect of such revolution is to gradually release the pressure upon the gasket by slackening up the longitudinal strain on the sleeve 22. This rotation is arrested by the engagement of the stop-pin 39 against the lug 27. Further rotation of the ring 33 is transmitted to the sleeve 22 by means of the pin and lug in such wise that the ribs 30 are disengaged from the ribs 19 without the necessity of any separate operation and the hose sections are allowed to fall freely apart.

Modification in detail, proportion of parts etc., may be resorted to without departing from the spirit of the invention or sacrificing any of its advantages.

What I claim as new is:—

1. In a hose coupling, a body portion having an annular interrupted flange between its ends and projections at one end extending in the direction of the length of the body, a coöperating member having separated flanges and a socket for a gasket, a coupling sleeve having separated flanges and a reduced portion with lug extended beyond the end thereof to engage in the space between the ends of the portions of the interrupted flange, and a tightening and locking ring having threaded engagement with the coupling sleeve.

2. In a hose coupling, a body portion having an annular interrupted flange between its ends and projections at one end extending in the direction of the length of the body, a coöperating member having separated flanges and a socket for a gasket, a coupling sleeve having separated flanges and a reduced portion with lug extended beyond the end thereof to engage in the space between the ends of the portions of the interrupted flange, and a tightening and locking ring having threaded engagement with the coupling sleeve, the entering ends of said flanges being tapered.

3. In a hose coupling, a body portion having at one end an annular internal flange and projections extending in the direction of the length of the body portion, and between its ends with a peripheral interrupted flange and reduced portion forming a shoulder, a coöperating member having at one end an internal annular flange, an exterior flange and at the end with a gasket-receiving socket and separated flanges adjacent thereto, a coupling sleeve having internal separated flanges and an exteriorly threaded portion and a reduced portion with lug extending beyond the end thereof to move in the space between the ends of the portions of said interrupted flange, and a tightening and locking ring engaging said threaded portion.

4. In a hose coupling, a body portion having at one end an annular internal flange and projections extending in the direction of the length of the body portion, and between its ends with a peripheral interrupted flange and reduced portion forming a shoulder, a coöperating member having at one end an internal annular flange, an exterior flange and at the end with a gasket-receiving socket and separated flanges adjacent thereto, a coupling sleeve having internal separated flange and an exteriorly threaded portion, a tightening and locking ring engaging said threaded portion, and means for limiting the rotation of said ring.

5. In a hose coupling, a body portion having between its ends a peripheral interrupted flange and a reduced portion with shoulder, a coöperating member adapted to interlock with the body portion and carrying a gasket, a coupling sleeve having a threaded peripheral portion, a tightening and locking ring having threaded engagement therewith and a stop member extending radially of the ring and adapted to engage the sleeve to limit the rotation of the ring.

6. In a hose coupling, a body portion having between its ends a peripheral interrupted flange and a reduced portion with shoulder, a coöperating member adapted to interlock with the body portion and carrying a gasket, a coupling sleeve having a threaded peripheral portion, a tightening and locking ring having threaded engagement therewith, a stop member extending radially of the ring and adapted to engage the sleeve to limit the rotation of the ring, and means permitting endwise movement of the sleeve without engagement with said interrupted flange.

7. In a hose coupling, a body portion having between its ends an interrupted peripheral flange and an adjacent reduced portion with annular shoulder, a coöperating member constructed to interlock with the body portion, a coupling sleeve having at one end a reduced portion with lug extended beyond the end thereof to be received in the interruptions of the interrupted flange and constructed to interlock with the coöperating member, and a tightening and locking ring having threaded engagement with the coupling sleeve and having an internal annular shoulder to engage the shoulder of the body portion.

8. In a hose coupling, a body portion having between its ends an interrupted peripheral flange and an adjacent reduced portion with annular shoulder, a coöperating member constructed to interlock with the body portion, a coupling sleeve constructed to interlock with the coöperating member, a tightening and locking ring having threaded engagement with the coupling sleeve and having an internal annular shoulder to engage the shoulder of the body portion, and coöperating means between said ring and sleeve for limiting the rotation of the ring.

9. In a hose coupling, a body portion having between its ends an interrupted peripheral flange and an adjacent reduced portion with annular shoulder, a coöperating member constructed to interlock with the body portion, a coupling sleeve constructed to interlock with the coöperating member, a tightening and locking ring having threaded engagement with the coupling sleeve and having an internal annular shoulder to engage the shoulder of the body portion, cooperating means between said ring and sleeve for limiting the rotation of the ring, the outer end of the ring being rounded, and the coöperating member having an exterior rounded flange.

10. In a hose coupling, a body portion having between its ends an interrupted peripheral flange and a reduced portion with shoulder adjacent said flange, a member constructed to interlock with the body portion, a coupling sleeve constructed to interlock with the said member and having external threads and reduced portion adjacent the threads with a lug extending from the said reduced portion and having a shoulder adjacent the threads, a tightening and locking ring having threaded engagement with the sleeve and inturned end to engage said shoulder, and a detachable screw mounted in said ring and extending inward with its inner end disposed between said shoulder and the threads of the coupling sleeve and engageable with said lug whereby further rotation of said ring is transmitted to said sleeve by said pin and lug.

Signed by me at Washington, D. C. this 3rd day of February 1909.

VINCEN P. McVOY.

Witnesses:
ROBERT A. BOSWELL,
E. H. BOND.